United States Patent
Miyake et al.

(10) Patent No.: US 11,579,059 B2
(45) Date of Patent: Feb. 14, 2023

(54) INSPECTION APPARATUS AND INSPECTION METHOD FOR INSPECTION TARGET

(71) Applicant: MITSUBISHI HEAVY INDUSTRIES, LTD., Tokyo (JP)

(72) Inventors: Hisao Miyake, Tokyo (JP); Yoshihiro Fujioka, Yokohama (JP); Yoshiyuki Morii, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 287 days.

(21) Appl. No.: 16/190,390

(22) Filed: Nov. 14, 2018

(65) Prior Publication Data

US 2019/0391059 A1    Dec. 26, 2019

(30) Foreign Application Priority Data

Jun. 26, 2018  (JP) .............................. JP2018-120360

(51) Int. Cl.
   *G01N 3/34*    (2006.01)
   *G01N 3/04*    (2006.01)
   (Continued)

(52) U.S. Cl.
   CPC ............. *G01N 3/34* (2013.01); *B64C 39/064* (2013.01); *G01M 5/0066* (2013.01); *G01M 7/08* (2013.01); *G01N 3/04* (2013.01); *G01N 29/045* (2013.01)

(58) Field of Classification Search
   CPC .......... G01N 3/34; G01N 3/04; G01N 29/045; G01M 7/08; G01M 5/0066
   (Continued)

(56) References Cited

U.S. PATENT DOCUMENTS 5,048,320 A * 9/1991 Mitsuhashi ............. G01M 7/08
                                                73/12.09
6,327,921 B1 * 12/2001 Hsu .................... G01N 29/0645
                                                73/866.5
(Continued)

FOREIGN PATENT DOCUMENTS

CN   101029856 A   *  9/2007
CN   107607690 A   *  1/2018
(Continued)

OTHER PUBLICATIONS

Translation JP-2010271116-A (Year: 2010).*
(Continued)

*Primary Examiner* — Alexander A Mercado
*Assistant Examiner* — Monica S Young
(74) *Attorney, Agent, or Firm* — Manabu Kanesaka; Benjamin Hauptman; Kenneth Berner

(57) ABSTRACT

Whether an internal defect is present in an inspection target is readily judged. Provided is an inspection method for an inspection target that is a layered structure including an FRP material and/or a structure made of resin, the method including the steps of: tapping, with a tapping tool, an inspection target area on a surface of the inspection target; detecting, by an accelerometer mounted to the tapping tool, an acceleration signal corresponding to acceleration of the tapping tool due to reaction force against the tapping; recording waveform data about the detected acceleration signal; creating a contour map corresponding to the inspection target area, based on the recorded waveform data; displaying the contour map on a display unit; and judging whether an internal defect is present in the inspection target, based on the contour map displayed on the display unit.

8 Claims, 9 Drawing Sheets

(51) Int. Cl.
- *G01M 5/00* (2006.01)
- *G01N 29/04* (2006.01)
- *G01M 7/08* (2006.01)
- *B64C 39/06* (2006.01)

(58) Field of Classification Search
USPC .................................................. 73/12.09
See application file for complete search history.

(56) References Cited

U.S. PATENT DOCUMENTS

| | | | | |
|---|---|---|---|---|
| 6,339,960 | B1* | 1/2002 | Costley | G01F 22/02 73/52 |
| 7,472,598 | B2* | 1/2009 | Kleinert | G01N 29/0609 73/602 |
| 9,068,909 | B2* | 6/2015 | Knox | G01M 7/08 |
| 9,776,200 | B2* | 10/2017 | Busby | B05B 9/0403 |
| 10,011,352 | B1* | 7/2018 | Dahlstrom | G05D 1/0088 |
| 10,195,629 | B1* | 2/2019 | Dahlstrom | B05B 12/08 |
| 10,821,463 | B2* | 11/2020 | Busby | B05B 13/005 |
| 11,235,890 | B1* | 2/2022 | Dahlstrom | B64D 47/08 |
| 2008/0060412 | A1* | 3/2008 | Palmer | G01M 5/0075 73/12.09 |
| 2012/0059600 | A1* | 3/2012 | Xiang | G01N 29/4409 702/39 |
| 2014/0184524 | A1* | 7/2014 | Schiefer | G06F 3/0484 345/173 |
| 2015/0274294 | A1* | 10/2015 | Dahlstrom | E04G 23/002 239/722 |
| 2015/0344136 | A1* | 12/2015 | Dahlstrom | B05B 13/005 239/722 |
| 2016/0082460 | A1* | 3/2016 | McMaster | B05B 13/005 239/722 |
| 2016/0378105 | A1* | 12/2016 | Tanigawa | E04G 23/002 134/18 |
| 2017/0192418 | A1* | 7/2017 | Bethke | G08G 5/0086 |
| 2017/0313332 | A1* | 11/2017 | Paget | B61L 25/021 |
| 2018/0043386 | A1* | 2/2018 | Busby | B05B 9/007 |
| 2020/0378927 | A1* | 12/2020 | Nishizawa | G01N 29/225 |
| 2021/0114051 | A1* | 4/2021 | Busby | B05B 12/122 |
| 2021/0155344 | A1* | 5/2021 | Mura Yañez | B64D 1/18 |

FOREIGN PATENT DOCUMENTS

| | | | | |
|---|---|---|---|---|
| EP | 0351430 | A1* | 1/1990 | G01M 7/08 |
| EP | 3267191 | A1 | 1/2018 | |
| JP | 2006-250660 | A | 9/2006 | |
| JP | 2006-275742 | A | 10/2006 | |
| JP | 2006-292481 | A | 10/2006 | |
| JP | 2010-271116 | A | 12/2010 | |
| JP | 2010-286437 | A | 12/2010 | |
| JP | 2010271116 | A* | 12/2010 | |
| JP | 2015-190832 | A | 11/2015 | |
| JP | 2017-090328 | A | 5/2017 | |
| JP | 6185541 | B2 | 8/2017 | |
| JP | 2019082460 | A* | 5/2019 | |
| KR | 101729285 | B1* | 4/2017 | |
| KR | 20200018115 | A* | 2/2020 | |
| WO | WO-8907249 | A1* | 8/1989 | G01M 7/08 |
| WO | WO-2006074506 | A1* | 7/2006 | G01M 5/0066 |
| WO | 2016/139928 | A1 | 9/2016 | |
| WO | WO-2018148636 | A1* | 8/2018 | B64C 27/12 |

OTHER PUBLICATIONS

Translation CN-107607690 (Year: 2017).*
Translation JP-2019082460-A (Year: 2019).*
Translation KR-101729285-B1 (Year: 2017).*
Europe Patent Office, "Search Report for European Patent Application No. 18208695.9," dated Aug. 7, 2019.
Europe Patent Office, "Search Report for European Patent Application No. 18208695.9," dated May 10, 2019.
Yang, R. et al., "Progress and trends in nondestructive testing and evaluation for wind turbine composite blade," Renewable and Sustainable Energy Reviews, Mar. 15, 2016, p. 1225-1250, vol. 60, Elseviers Science, New York, NY, U.S.A.
Japan Patent Office, "Office Action for Japanese Patent Application No. 2018-120360," dated Jul. 30, 2019.

* cited by examiner

FIG. 6

| TEST PIECE | DELAMI-NATION POSITION | EVALUATION METHOD | | | | |
|---|---|---|---|---|---|---|
| | | REVERBE-RATION TIME METHOD | PULSE POWER METHOD | TRANSFER FUNCTION REFERENCE METHOD | TRANSFER FUNCTION CORRELATION METHOD | ENVELOPE PROCESSING |
| FRP SINGLE PLATE | 5A | × | △ | ○ | × | ○ |
| | 5A | × | △ | ○ | × | ○ |
| SANDWICH MATERIAL | 4A | × | ○ | △ | × | ○ |
| | 4B | × | ○ | △ | × | ○ |
| SHEAR WEB PART | A SIDE | × | △ | × | × | △ |
| | B SIDE | × | ○ | △ | × | △ |

LEGENDS  ○ : DETECTION SUCCEEDED
△ : DETECTION SUCCEEDED BUT RESULT INCLUDED MEASUREMENT ERROR
× : DETECTION FAILED

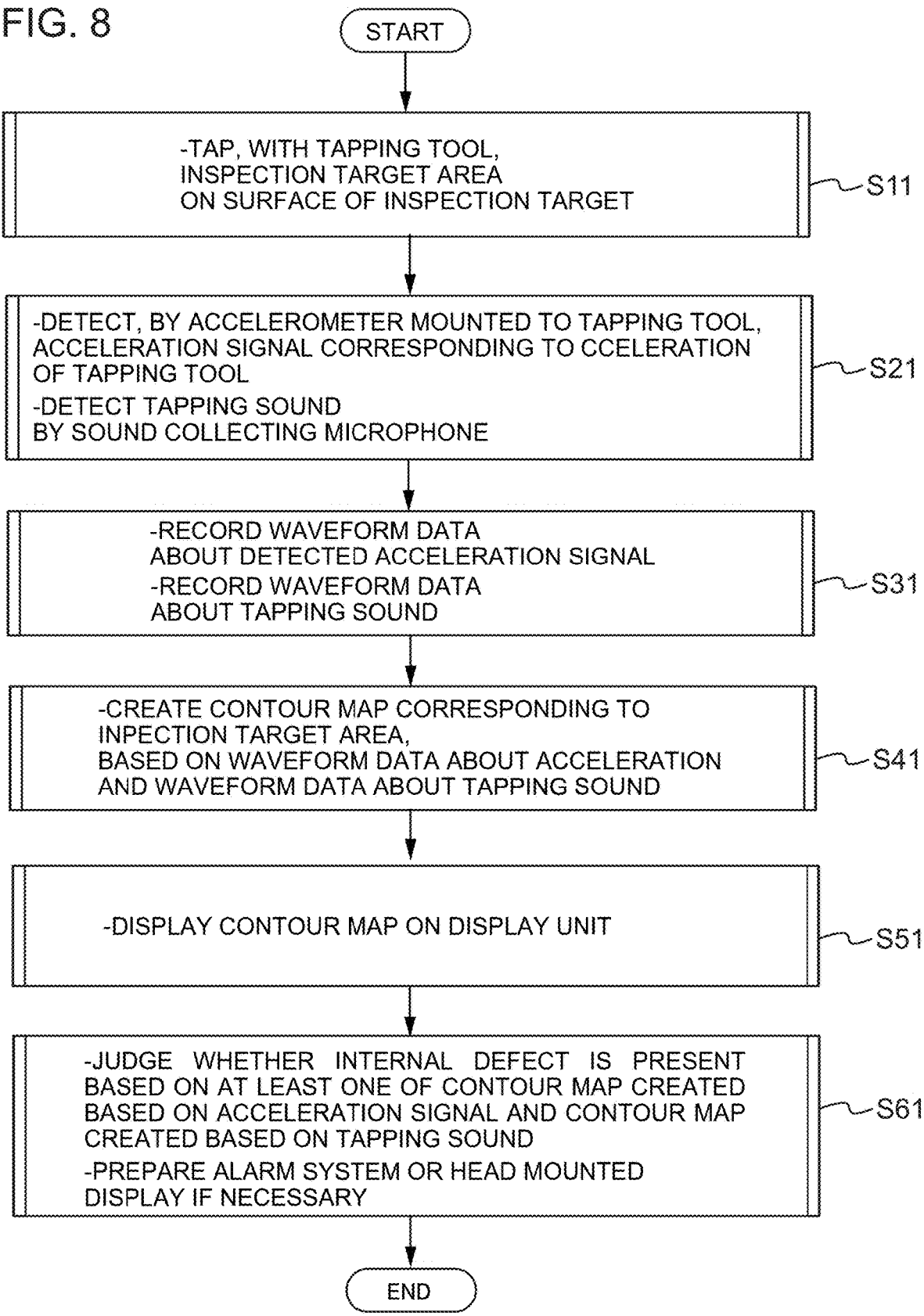

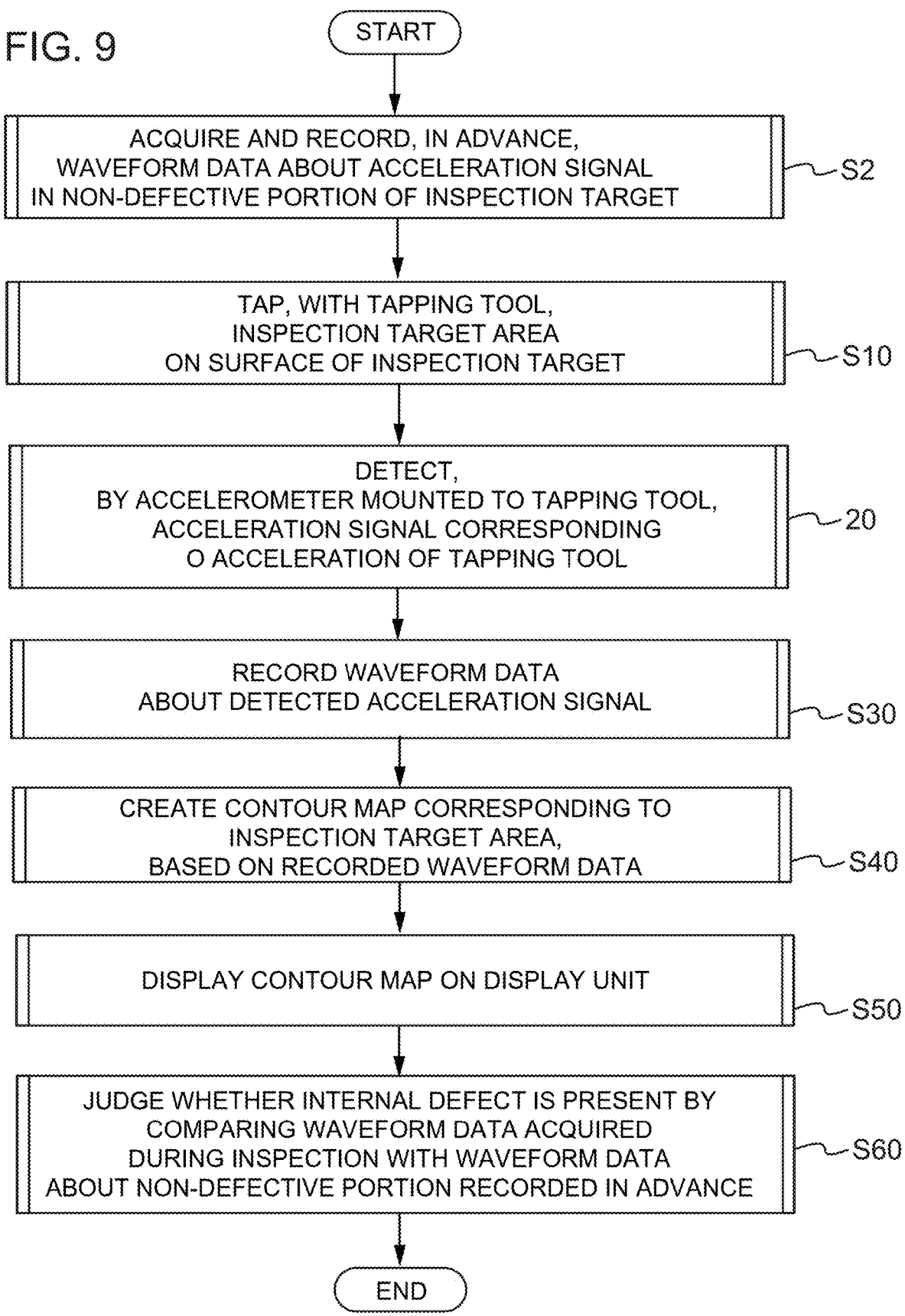

INSPECTION APPARATUS AND INSPECTION METHOD FOR INSPECTION TARGET

RELATED APPLICATIONS

The present application is based on, and claims priority from, Japanese Application No. JP2018-120360 filed Jun. 26, 2018, the disclosure of which is hereby incorporated by reference herein in its entirety.

TECHNICAL FIELD

This disclosure relates to an inspection apparatus and an inspection method for an inspection target.

BACKGROUND

Various methods for inspecting the soundness of wind turbine generation facilities have been known.

Patent Document 1 discloses a technique of tapping, with a tapping tool, a surface of a blade of wind turbine generator, and detecting and analyzing an acceleration signal corresponding to acceleration of the tapping tool due to reaction force against the tapping, to judge whether a defect is present in the blade.

CITATION LIST

Patent Literature

Patent Document 1: Japanese Patent No. 6185541

SUMMARY

The inspection described above is for judging whether a defect is present in an inspection target so that whether the inspection target needs to be repaired as well as a repairing range can be determined. In this context, the position and seriousness of the defected portion in the inspection target are desirably recognized readily and accurately. Unfortunately, the technique disclosed in Patent Document 1 does not necessarily achieve a sufficient level of readiness to recognize the position and the seriousness of a defect in relation to an inspection target.

In view of the above, an object of at least one embodiment of the disclosure is to enable whether an internal defect is present in an inspection target.

(1) An inspection method according to at least one embodiment of the disclosure is an inspection method for an inspection target that is a layered structure including a fiber reinforced plastic (hereinafter FRP) material and/or a structure made of resin, the method including the steps of: tapping, with a tapping tool, an inspection target area on a surface of the inspection target; detecting, by an accelerometer mounted to the tapping tool, an acceleration signal corresponding to acceleration of the tapping tool due to reaction force against the tapping; recording waveform data about the detected acceleration signal; creating a contour map corresponding to the inspection target area, based on the recorded waveform data; displaying the contour map on a display unit; and judging whether an internal defect is present in the inspection target, based on the contour map displayed on the display unit.

The method described in (1) includes: tapping, with the tapping tool, the inspection target area on the surface of the inspection target; detecting, by the accelerometer, the acceleration signal corresponding to the acceleration of the tapping tool due to the reaction force against the tapping; and recording the waveform data about the detected acceleration signal. The method further includes: creating the contour map corresponding to the inspection target area, based on the recorded waveform data; displaying the contour map on the display unit; and judging whether an internal defect is present in the structure that is a layered structure including an FRP material and/or a structure made of resin, based on the displayed contour map.

With the method described in (1), whether the internal defect is present in the inspection target can be judged without being affected by surrounding noise during the measurement for example, because the accelerometer mounted to the tapping tool detects the waveform data about the acceleration signal. Furthermore, whether the internal defect is present in the inspection target can readily be judged without requiring an inspector to have experience or intuition for example, because the contour map corresponding to the inspection target area is displayed on the display unit, so that whether the internal defect is present can readily be recognized visually.

(2) In some embodiments, the inspection method described in (1) may further include a step of measuring, by a sound collecting microphone, a tapping sound of the tapping. The step of recording may include recording waveform data about the tapping sound, the step of creating the contour map may include creating the contour map based on the recorded waveform data about the acceleration signal, and the contour map based on the waveform data about the tapping sound, and the step of judging may include judging whether the internal defect is present based on at least one of the contour map created based on the acceleration signal or the contour map created based on the tapping sound, and preparing an alarm system and/or an eyewear head mounted display, for issuing a notification to an inspector if necessary.

In the method described in (2), the tapping sound of the tapping is measured by the sound collecting microphone to record the waveform data about the tapping sound, and the contour map based on the waveform data about the acceleration signal, and the contour map based on the waveform data about the tapping sound are created. Then whether the internal defect is present is judged based on at least one of the contour maps. Thus, whether the internal defect is present can be judged based on at least one of the acceleration signal or the tapping sound of the tapping, whereby accuracy of the judgement can be improved.

(3) In some embodiments, the inspection method described in (1) or (2) may further include a step of acquiring and recording, in advance, waveform data about the acceleration signal in a non-defective portion of the inspection target.

The step of judging may include judging whether the internal defect is present by comparing the waveform data acquired during inspection with the waveform data about the non-defective portion recorded in advance.

With the method described in (3), whether the internal defect is present in the inspection target can be judged by comparing the waveform data acquired during inspection with the waveform data about the acceleration signal in the non-defective portion of the inspection target acquired and recorded in advance. In other words, whether the internal defect is present can be judged by comparing a result of the detection based on the acceleration signal and/or the tapping sound of the tapping with the waveform data about the non-defective portion acquired and recorded in advance. Thus, the accuracy of the judgement can further be improved.

(4) In some embodiments, in the method described in any one of (1) to (3), the step of tapping may include tapping each grid of the inspection target area segmented into grids.

With the method described in (4), the inspection target area can be evenly inspected by tapping each grid of the inspection target area segmented into grids. The resultant contour map more accurately reflects the internal defect than that obtained by randomly tapping the inspection target area not segmented into grids, for example. Thus, the accuracy of the judgement can be improved.

(5) In some embodiments, in the method described in any one of (1) to (4), the step of creating the contour map may include:

obtaining, as data (Zn) on each measurement point of the inspection target area, an average value of results (Ln/Fn) each obtained by dividing a result (Ln) of frequency analysis performed on time series data (Tn) acquired for the measurement point, by exciting force (Fn) at a timing of the acquisition, the average value being based on number of times of the acquisition; and calculating a band level of a frequency band to be evaluated in terms of the data (Zn).

With the method described in (5), as data (Zn) on each measurement point of the inspection target area, a value can be used which is obtained by averaging, according to the number of times of the acquisition, an average value of results (Ln/Fn) each obtained by dividing a result (Ln) of frequency analysis performed on time series data (Tn) acquired for the measurement point, by exciting force (Fn) at a timing of the acquisition of time series data (Tn). Thus, the data is less likely to fluctuate to lead to erroneous detection, whereby the accuracy of the judgement can be improved. Furthermore, the band level of the frequency band to be evaluated in terms of the data (Zn) on each measurement point is calculated. Thus, data to be acquired can be extracted while focusing on a frequency band to be focused that is judged based on the type of the data such as vibrations or sound. Thus, the contour map can be more accurately created.

(6) In some embodiments, in the method described in any one of (1) to (5), the step of creating the contour map may include:

analyzing the waveform data about the acceleration signal with a pulse power method, and analyzing the waveform data about the tapping sound with envelope processing.

The present inventors have made vigorous studies to find out that the internal defect in the inspection target can be accurately detected by analyzing the waveform data about the acceleration signal of the tapping with the pulse power method, and by analyzing the waveform data about the tapping sound with the envelope processing.

Thus, with the method described in (6), the respective methods enabling highly accurate detection can be used for analyzing each of the waveform data about the acceleration signal and the waveform data about the tapping sound. All things considered, whether the internal defect is present can be more accurately judged by utilizing the combination between the methods and the respective types of waveform data.

(7) In some embodiments, in the method described in any one of (1) to (6), the inspection target may be a wind turbine blade of a wind turbine generation facility.

With the method described in (7), the advantage described in any one of (1) to (6) can be obtained in a situation where the inspection target is the wind turbine blade of the wind turbine generation facility.

(8) An inspection apparatus for an inspection target according to at least one embodiment of the disclosure is an inspection apparatus for an inspection target that is a layered structure including an FRP material and/or a structure made of resin, the inspection apparatus including: a tapping device including a tapping tool for tapping an inspection target area on a surface of the inspection target, and an accelerometer that detects an acceleration signal corresponding to acceleration of the tapping tool due to reaction force against the tapping; a recording unit that records waveform data about the acceleration signal detected by the accelerometer; a data processing unit that judges whether an internal defect is present in the inspection target, based on the waveform data; and a display unit that displays a processing result obtained by the data processing unit. The data processing unit is configured to create a contour map corresponding to the inspection target area based on the waveform data recorded in the recording unit, and to cause the display unit to display the contour map.

With the configuration described in (8), as described in (1), whether the internal defect is present in the inspection target can be judged without being affected by surrounding noise during the measurement for example, because the accelerometer of the tapping device detects the waveform data about the acceleration signal corresponding to acceleration of the tapping tool due to reaction force against the tapping. Furthermore, whether the internal defect is present in the inspection target can readily be judged without requiring an inspector to have experience or intuition for example, because the contour map corresponding to the inspection target area is displayed on the display unit as a result of processing by the data processing unit, so that whether the internal defect is present can readily be recognized visually.

(9) In some embodiments, in the configuration described in (8), the inspection apparatus for the inspection target may further include a sound collecting microphone for measuring a tapping sound of the tapping, the recording unit may be configured to record waveform data about the tapping sound measured by the sound collecting microphone, and the data processing unit may be configured to judge whether the internal defect is present based on the waveform data about the acceleration signal recorded in the recording unit or the waveform data about the tapping sound.

With the configuration described in (9), as described in (2), the tapping sound of the tapping is measured by the sound collecting microphone, the waveform data about the tapping sound is recorded, and the contour map based on the recorded waveform data about the acceleration signal, and the contour map based on the recorded waveform data about the tapping sound are created. Then whether the internal defect is present is judged based on at least one of the contour maps. Thus, whether the internal defect is present can be judged based on at least one of the acceleration signal or the tapping sound of the tapping, whereby accuracy of the judgement can be improved.

(10) In some embodiments, in the configuration described in (8) or (9), the recording unit may record the waveform data about the acceleration signal in a non-defective portion of the inspection target or at any single point of the inspection target, the waveform data being acquired in advance, and the data processing unit may be configured to judge whether the internal defect is present by comparing the waveform data about the acceleration signal acquired during inspection with the waveform data about the non-defective portion or the waveform data at the any single point of the inspection target, the waveform data being recorded in advance.

With the configuration described in (10), as described in (3), whether the internal defect is present in the inspection target can be judged by comparing the waveform data acquired during inspection with the waveform data about the acceleration signal in the non-defective portion of the inspection target or the waveform data about the acceleration signal at the any single point of the inspection target, the waveform data being acquired and recorded in advance. In other words, whether the internal defect is present can be judged by comparing a result of the detection based on the acceleration signal and/or the tapping sound of the tapping with the waveform data about the non-defective portion or the waveform data at the any single point of the inspection target, the waveform data being acquired and recorded in advance. Thus, the accuracy of the judgement can further be improved.

(11) In some embodiments, in the configuration described in any one of (8) to (10), the inspection apparatus for the inspection target may further include:

a frame for mounting the tapping device;

a protrusion protruding from one side of the frame facing the surface of the inspection target; and a movement mechanism configured to be capable of changing an arrangement of the tapping device relative to the frame.

The movement mechanism may include:

first rails extending in a first direction along the one side of the frame;

a first slider movable along the first rail;

a second rail that is attached to the first slider, extends along the one side, and extends in a second direction intersecting with the first direction; and a second slider that carries the tapping device and is movable along the second rail.

With the configuration described in (11), the tapping device is mounted to the frame in such a manner that the arrangement of the tapping device relative to the frame is changeable by the movement mechanism. Specifically, the tapping device is carried by the second slider to be capable of moving in a plane relative to the frame along the first rail and the second rail. The tapping device can move in parallel with the surface of the inspection target, with the frame in contact with the surface of the inspection target via the protrusion. Thus, the tapping on the surface of the inspection target, the tapping sound based on the tapping, and the acceleration signal of the tapping tool can be efficiently and smoothly detected.

(12) In some embodiments, in the configuration described in (11), the inspection apparatus for the inspection target may further include:

a first driving source, a second driving source, and a third driving source that provide driving force to the first sliders, the second slider, and the tapping tool, respectively; and a controller that controls an operation of at least the first driving source, the second driving source, and the third driving source.

The controller may be configured to control the first driving source, the second driving source, and the third driving source to tap each grid of the inspection target area segmented into grids.

With the configuration described in (12), the controller can drive the first driving source, the second driving source, and the third driving source to tap each grid of the inspection target area segmented into grids. Thus, the inspection can be performed by automatically and sequentially tapping the inspection target area on the surface of the inspection target, whereby the efficiency of the inspection can largely be improved.

(13) In some embodiments, in the configuration described in any one of (8) to (12), the data processing unit may be configured to:

obtain, as data ($Zn$) on each measurement point of the inspection target area, an average value of results ($Ln/Fn$) each obtained by dividing a result ($Ln$) of frequency analysis performed on time series data ($Tn$) acquired for the measurement point, by exciting force ($Fn$) at a timing of the acquisition, the average value being based on number of times of the acquisition; and calculate a band level of a frequency band to be evaluated in terms of the data ($Zn$).

With the configuration described in (13), as described in (5), as data ($Zn$) on each measurement point of the inspection target area, a value can be used which is obtained by averaging, according to the number of times of the acquisition, an average value of results ($Ln/Fn$) each obtained by dividing a result ($Ln$) of frequency analysis performed on time series data ($Tn$) acquired for the measurement point, by exciting force ($Fn$) at a timing of the acquisition of time series data ($Tn$). Thus, the data is less likely to fluctuate to lead to erroneous detection, whereby the accuracy of the judgement can be improved. Furthermore, the band level of the frequency band to be evaluated in terms of the data ($Zn$) on each measurement point is calculated. Thus, data to be acquired can be extracted while focusing on a frequency band to be focused that is judged based on the type of the data such as vibrations or sound. Thus, the contour map can be more accurately created.

(14) In some embodiments, in the configuration described in any one of (8) to (13), the data processing unit may be configured to:

analyze the waveform data about the acceleration signal with a pulse power method; and analyze the waveform data about the tapping sound with envelope processing.

With the configuration described in (14), as described in (6), the respective methods enabling highly accurate detection can be used for analyzing each of the waveform data about the acceleration signal and the waveform data about the tapping sound. All things considered, whether the internal defect is present can be more accurately judged by utilizing the combination between the methods and the respective types of waveform data.

(15) In some embodiments, in the configuration described in any one of (8) to (14), the inspection target may be a wind turbine blade of a wind turbine generation facility.

With the configuration described in (15), the advantage described in any one of (8) to (14) can be obtained in a situation where the inspection target is the wind turbine blade of the wind turbine generation facility.

With at least one embodiment of the disclosure, whether an internal defect is present in an inspection target can readily be judged.

BRIEF DESCRIPTION OF DRAWINGS

FIG. 6 is a table illustrating detection results obtained with various inspection methods;

FIG. 8 is a flowchart illustrating an inspection method according to another embodiment; and FIG. 9 is a flowchart illustrating an inspection method according to another embodiment.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not limitative of the scope of the present invention.

For example, expressions that represent relative or absolute arrangements such as "in a direction", "along a direction", "parallel", "perpendicular", "center", "concentric", or "coaxial" refer not only to what exactly these expressions represent but also to states that allow tolerance or are relatively displaced by such a degree of angle or distance that can achieve the same functions.

For example, expressions on shapes such as rectangular or cylindrical refer not only to shapes such as rectangular or cylindrical in a geometrically exact sense but also to such shapes that include protrusions, recesses, chamfered parts, or the like as long as the same functions are available.

Expressions that represent "comprising", "including", "being provided with", "with", or "having" one component are not exclusive expressions that would exclude the existence of other component(s).

First of all, an inspection apparatus according to at least one embodiment of the disclosure is described.

Figure 1:
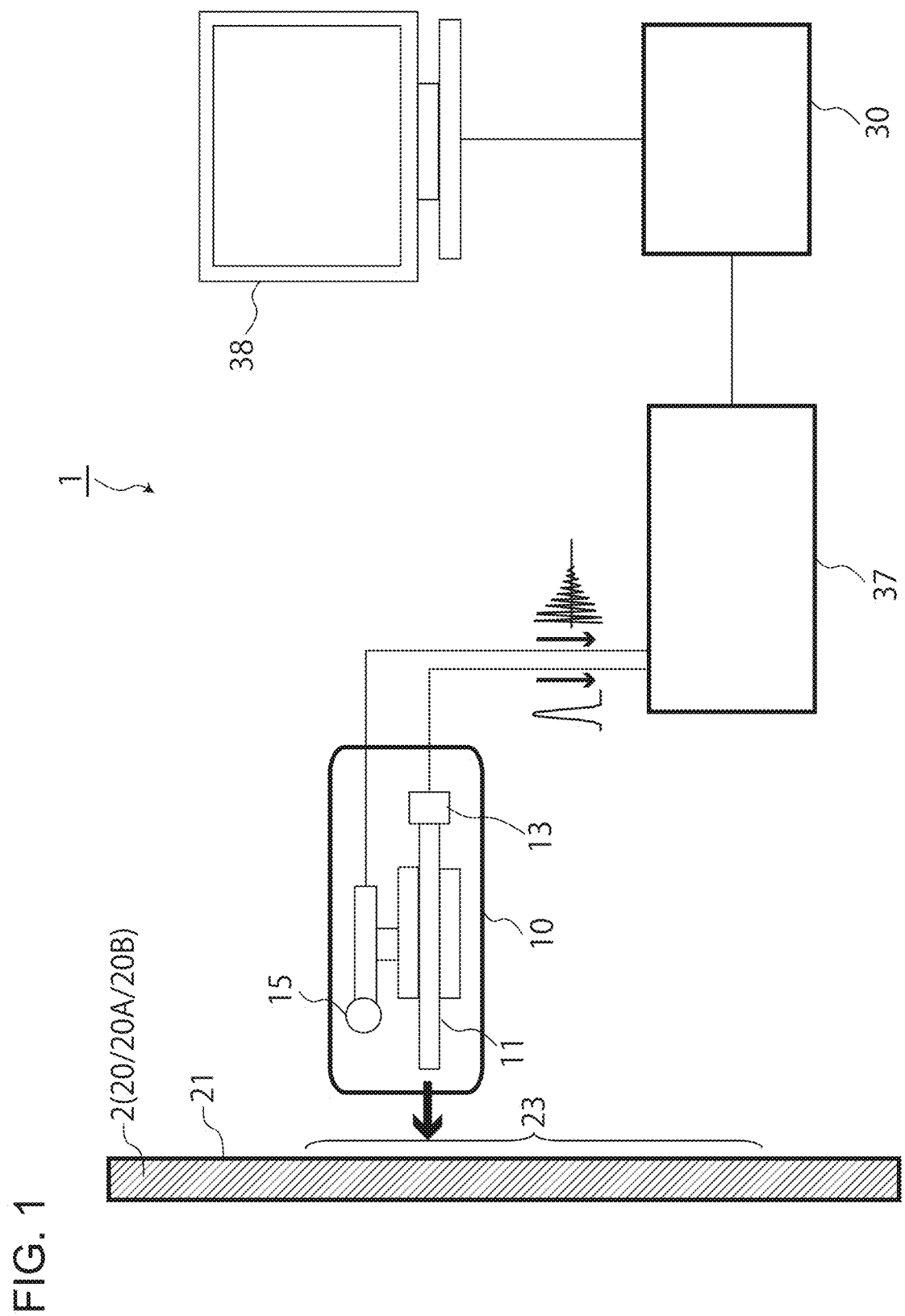
FIG. 1 is a schematic view illustrating a configuration example of an inspection apparatus according to one embodiment.
Figure 2A:
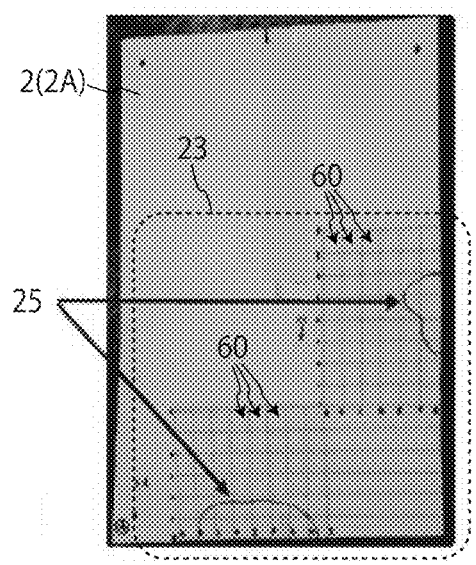
FIG. 2A to FIG. 2C are diagrams illustrating an example of a contour map according to one embodiment.
Figure 2B:
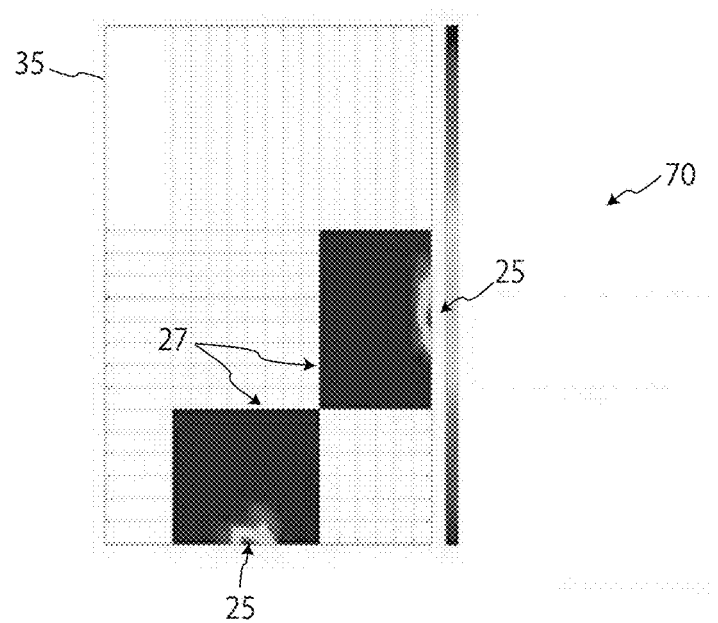
Figure 2C:
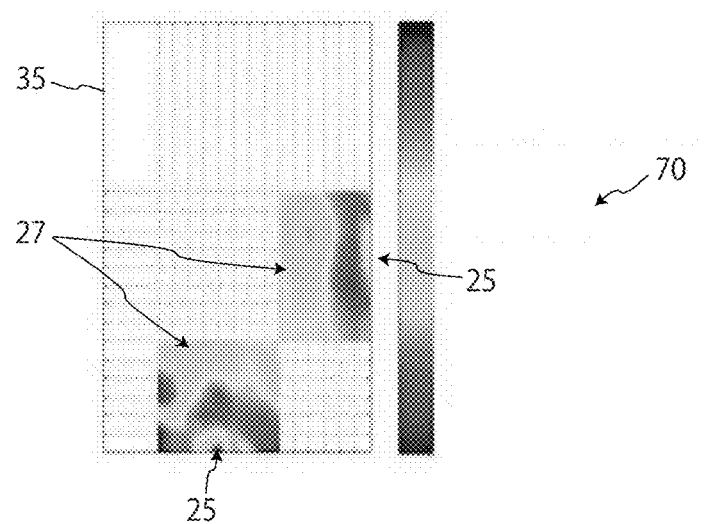
Figure 3:
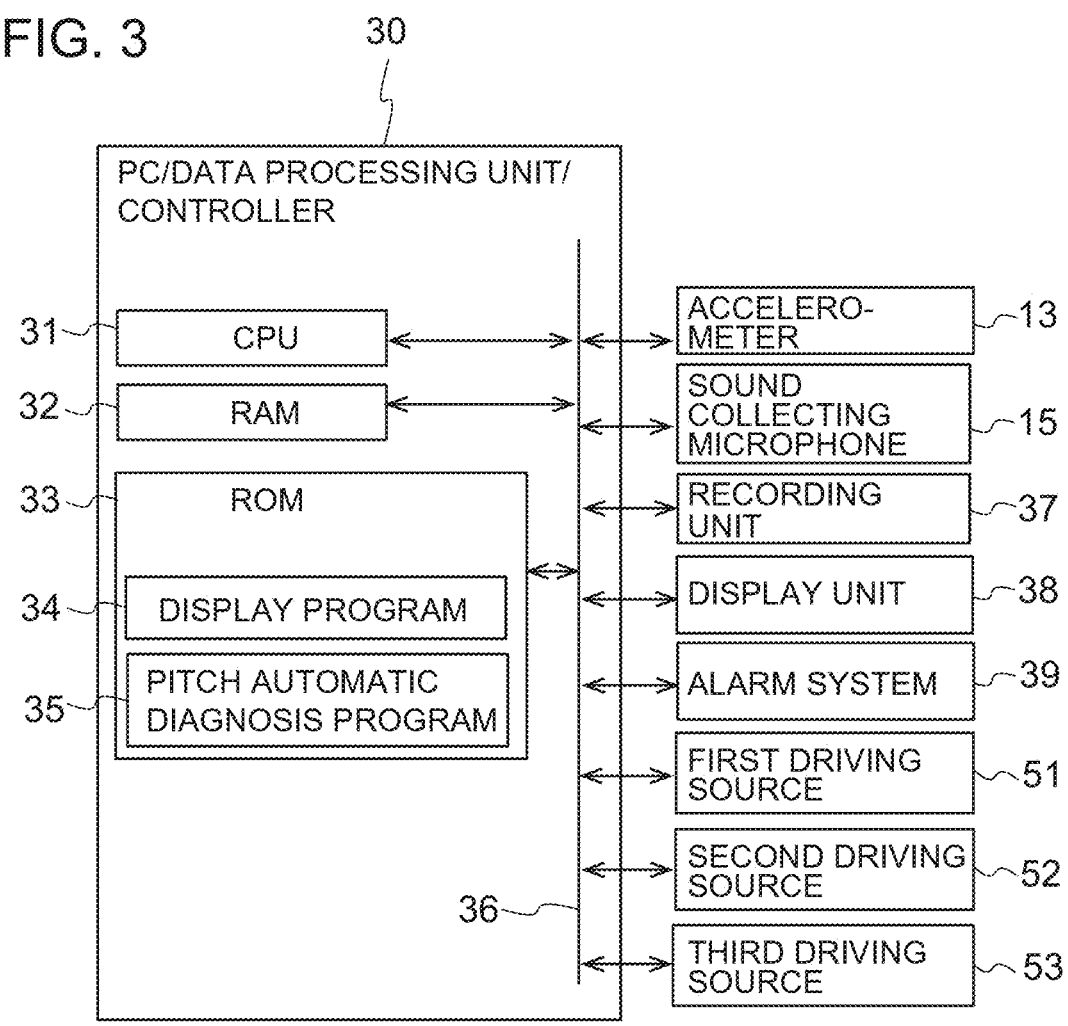
FIG. 3 is a control block diagram illustrating a configuration example of a data processing unit according to one embodiment.
Figure 4:
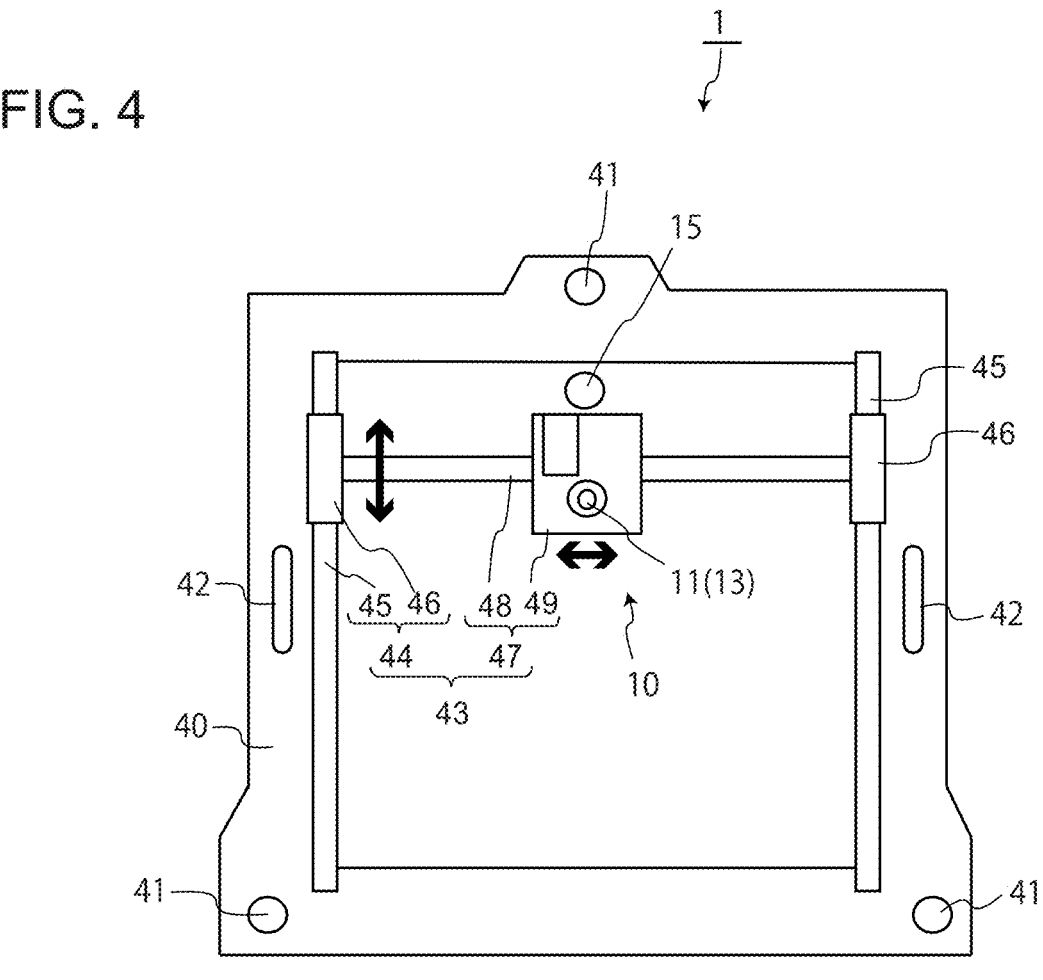
FIG. 4 is a schematic view illustrating a configuration example of an inspection apparatus according to another embodiment.
Figure 5:
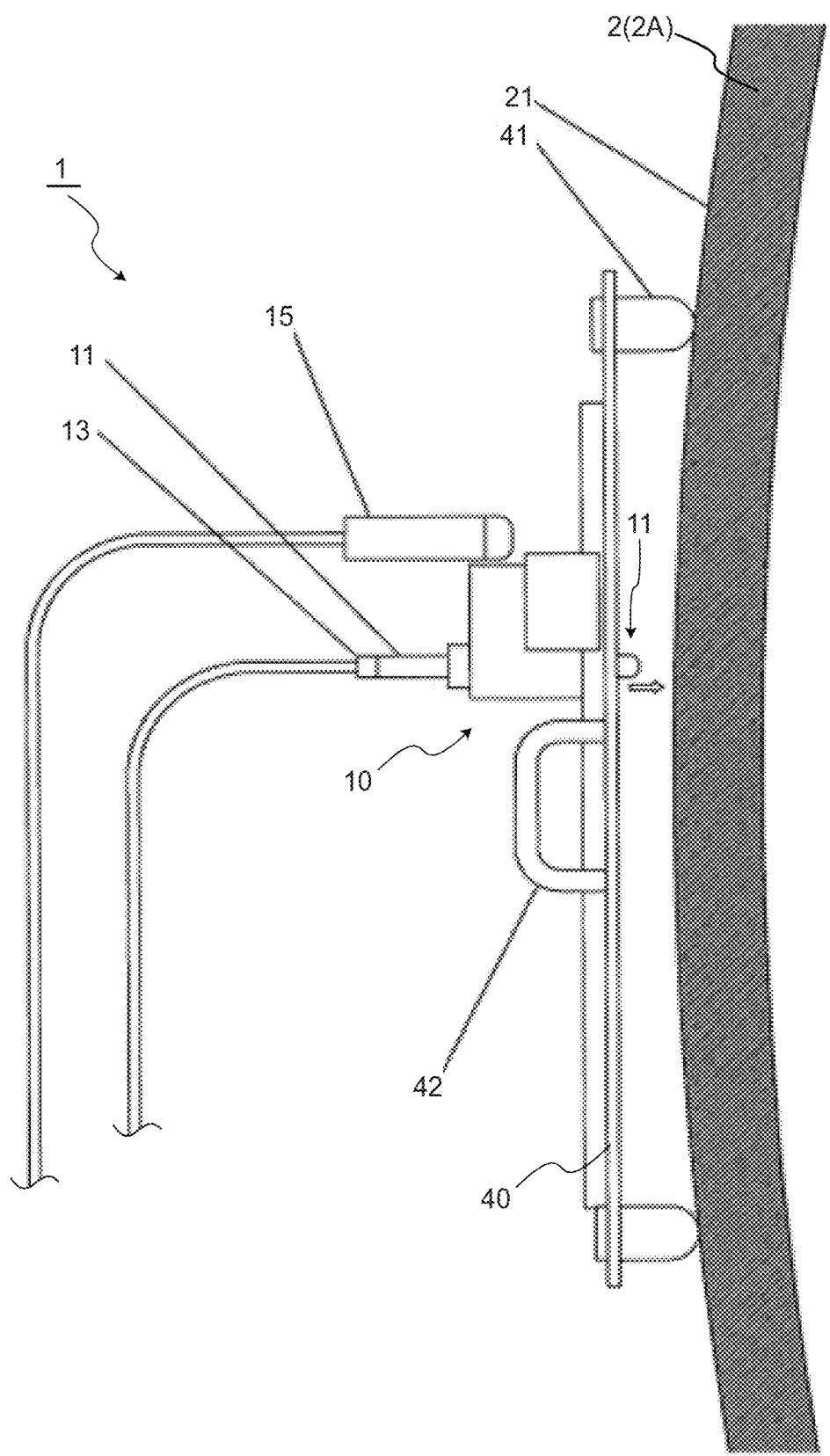
FIG. 5 is a schematic view illustrating a configuration example of the inspection apparatus according to the other embodiment.

FIG. 1 is a schematic view illustrating a configuration example of an inspection apparatus according to one embodiment. FIG. 2A to FIG. 2C are diagrams illustrating an example of a contour map according to one embodiment. FIG. 3 is a control block diagram illustrating a configuration example of a data processing unit according to one embodiment. FIG. 4 is a schematic view illustrating a configuration example of an inspection apparatus according to another embodiment. FIG. 5 is a schematic view illustrating a configuration example of the inspection apparatus according to the other embodiment. For example, the inspection apparatuses illustrated in FIG. 1, FIG. 4, and FIG. 5 are configured to be mounted to an unmanned aerial vehicle (UAV) or a drone to be capable of being remotely operated to be used while being pressed against a wind turbine blade.

As in a non-limiting example illustrated in FIG. 1, according to at least one embodiment of the disclosure, an inspection apparatus for an inspection target is an inspection apparatus 1 for an inspection target 2 that is a layered structure 20 including a fiber reinforced plastics (FRP) material 20A and/or a structure 20 made of resin 20B, the inspection apparatus 1 including: a tapping device 10 including a tapping tool 11 for tapping an inspection target area 23 on a surface 21 of the inspection target 2, and an accelerometer 13 that detects an acceleration signal corresponding to acceleration of the tapping tool 11 due to reaction force against the tapping; a recording unit 37 that records waveform data about the acceleration signal detected by the accelerometer 13; a data processing unit 30 that judges whether an internal defect is present in the inspection target 2, based on the waveform data; and a display unit 38 that displays a processing result obtained by the data processing unit 30.

The tapping device 10 may be configured to be capable of tapping the surface 21 of the inspection target 2 with a certain amount of force. For example, the tapping device 10 may be formed with an acceleration sensor attached to a general purpose hammer, or may use the tapping tool 11 with a built-in sensor (such as an impulse hammer for example).

The recording unit 37 is recording device capable of recording at least the waveform data about the acceleration signal. An example of the recording unit 37 may include a digital data recorder and the like.

The display unit 38 is a display device that displays a result of processing executed by the data processing unit 30, and may be a display configured to be capable of employing various systems, such as liquid crystal, plasma, organic EL, or projection, to display the result of the processing. For example, the display unit 38 may be an eyewear head mounted display or the like.

The data processing unit 30 according to at least one embodiment of the disclosure is configured to create a contour map 70 (see, for example, FIG. 2B and FIG. 2C) corresponding to the inspection target area 23 (see, for example, FIG. 2A) based on the waveform data stored in the recording unit 37, and causes the display unit 38 to display the contour map 70.

For example, the data processing unit 30 is a computer that may be a personal computer (PC) of various types such as a desktop computer, a laptop computer, or a tablet computer.

FIG. 3 is a control block diagram illustrating a configuration example of the data processing unit 30 according to one embodiment. As in a non-limiting example illustrated in FIG. 3, the data processing unit 30 may include a CPU 31, a read only memory (ROM) 33 serving as a storage unit that stores data such as various programs executed by the CPU 31 and a table, and a random access memory (RAM) 32 that functions as a work area serving as a loading area and a calculation for the programs to be executed, as well as a hard disk drive (HDD) serving as a unillustrated large capacity storage device, a communication interface for connecting to a communication network, an access unit to which an external storage device (such as the recording unit 37 exemplarily illustrated in FIG. 1, for example) is mounted, and the like. All of these components are connected to each other via a bus 36. Furthermore, the data processing unit 30 may be connected to an input unit (not illustrated), such as a keyboard and a mouse, the display unit 38, and the like.

In some embodiments, the ROM 33 may store a display program 34 for creating the contour map 70 corresponding to the inspection target area 23 based on the waveform data recorded in the recording unit 37, and for causing the display unit 38 to display the contour map 70. The CPU 31 may readout and load the display program 34 from the ROM 33 and onto the RAM 32, and execute the display program 34, so that the contour map 70 is displayed on the display unit 38.

With the above-described configuration, whether an internal defect 25 is present in the inspection target 2 can be judged without being affected by surrounding noise during the measurement for example, because the accelerometer 13 of the tapping device 10 detects the waveform data about the acceleration signal corresponding to acceleration of the tapping tool 11 due to reaction force against the tapping. Furthermore, whether the internal defect 25 is present in the inspection target 2 can readily be judged without requiring an inspector to have experience or intuition for example, because the contour map 70 corresponding to the inspection target area 23 is displayed on the display unit 38 as a result of processing by the data processing unit 30, so that whether the internal defect 25 is present can readily be recognized visually.

In some embodiments, the inspection apparatus 1 for the inspection target 2 may further include a sound collecting microphone 15 for measuring a tapping sound of the tapping (see FIG. 1, for example). In this case, the recording unit 37 may be configured to record waveform data about the tapping sound measured by the sound collecting microphone 15. The data processing unit 30 may be configured to judge whether the internal defect 25 is present based on the waveform data about the acceleration signal recorded in the recording unit 37 or the waveform data about the tapping sound.

In this configuration, the ROM 33 may store a program (not illustrated) for judging whether the internal defect 25 is present based on the waveform data about the acceleration signal or the waveform data about the tapping sound recorded in the recording unit 37. The CPU 31 may readout and load this program from the ROM 33 and onto the RAM 32, and execute the program, so that the contour map 70 based on the waveform data about the acceleration signal or the waveform data about the tapping sound is displayed on the display unit 38.

FIG. 2B illustrates a non-limiting example of the contour map 70 created based on the waveform data about the acceleration signal as a result of tapping the inspection target area 23 illustrated in FIG. 2A with the tapping tool 11, and FIG. 2C illustrates a non-limiting example of the contour map 70 created based on the waveform data about the tapping sound detected by the sound collecting microphone 15 when the inspection target area 23 in FIG. 2A is struck by the tapping tool 11. An internal delamination is formed in the area of the internal defect 25 in FIG. 2A, and it can be seen that the internal defect 25 is successfully visually reproduced on the display unit 38 with both of the contour maps 70.

With this configuration, the tapping sound of the tapping is measured by the sound collecting microphone 15 to record the waveform data about the tapping sound. Then, the contour map 70 based on the recorded waveform data about the acceleration signal and the contour map based on the waveform data about the tapping sound are created. Then whether the internal defect 25 is present is judged based on at least one of the contour maps 70. Thus, whether the internal defect 25 is present can be judged based on at least one of the acceleration signal or the tapping sound of the tapping, whereby accuracy of the judgement can be improved.

In some embodiments, the recording unit 37 may record the waveform data about the acceleration signal in a non-defective portion 27 of the inspection target 2 (see FIG. 2B and FIG. 2C, for example) or at any single point of the inspection target 2, the waveform data being acquired in advance. The non-defective portion 27 may be a portion of the inspection target 2 with no defect on the surface 21 or inside the inspection target 2. The data obtained on the non-defective portion 27 may be used as reference comparative data representing a case where the internal defect 25 is not present.

The data processing unit 30 may be configured to judge whether the internal defect 25 is present by comparing the waveform data about the acceleration signal acquired during inspection with the waveform data about the non-defective portion 27 or the waveform data at the any single point of the inspection target 2, the waveform data being recorded in advance.

In this case, the ROM 33 may store a program (not illustrated) for comparing the waveform data about the acceleration signal acquired during inspection with the waveform data about the non-defective portion 27 or the waveform data at the any single point of the inspection target 2, the waveform data being recorded in advance, to judge whether the internal defect 25 is present. The CPU 31 may readout and load this program from the ROM 33 and onto the RAM 32 and execute the program, whereby the waveform data about the acceleration signal acquired during inspection is compared with the waveform data about the non-defective portion 27 or the waveform data at the any single point of the inspection target 2, the waveform data being recorded in advance, and whether the internal defect 25 2 is present can be judged.

With this configuration, whether the internal defect 25 of the inspection target 2 is present can be judged by comparing the waveform data acquired during inspection with the waveform data about the acceleration signal in the non-defective portion 27 of the inspection target 2 or the waveform data about the acceleration signal at the any single point of the inspection target 2, the waveform data being acquired and recorded in advance. In other words, whether the internal defect 25 is present can be judged by comparing a result of the detection based on the acceleration signal and/or the tapping sound of the tapping with the waveform data about the non-defective portion 27 or the waveform data at the any single point of the inspection target 2, the waveform data being acquired and recorded in advance. Thus, the accuracy of the judgement can further be improved.

As in non-limiting example illustrated in FIG. 4 and FIG. 5, in some embodiments, the inspection apparatus 1 for the inspection target 2 may further include: a frame 40 for mounting the tapping device 10; a protrusion 41 protruding from one side of the frame 40 facing the surface 21 of the inspection target 2; and a movement mechanism 43 configured to be capable of changing an arrangement of the tapping device 10 relative to the frame 40.

For example, the frame 40 may be a frame member having a substantially square loop shape in a plan view, and may be configured such that the tapping device 10 can tap the surface 21 of the inspection target 2 with the tapping tool 11 through an opening on the inner side of the frame 40 (in a direction orthogonal to the sheet plane of FIG. 4, and in a left and right direction on the sheet place of FIG. 5). The frame 40 may be provided with at least one handle 42 (holding portion) so that an inspector can carry the tapping device 10 together with the frame 40. The frame 40 may have any configuration of being capable of carrying the tapping device 10 while enabling the inspection target area 23 to be struck by the tapping tool 11, and is not limited to any particular shape.

The protrusion 41 is for fixing the frame 40 to the surface 21 while ensuring a certain distance between the tapping device 10 and the surface 21 of the inspection target 2, and is provided in plurality on one side of the frame 40 facing the surface 21 of the inspection target 2. In some embodiment, for example, the frame 40 may be provided with the three protrusions 41 provided at three different points, to be supported by the surface 21 at these three points (see FIG. 4).

The movement mechanism 43 may include: first rails 45 extending in a first direction (an X direction in FIG. 4 for example) along the one side of the frame 40; a first slider 46 movable along the first rail 45; a second rail 48 that is attached to the first slider 46, extends along the one side, and extends in a second direction (a Y direction in FIG. 4 for example) intersecting with the first direction; and a second slider 49 that carries the tapping device 10 and is movable along the second rail 48. Specifically, for example, the first rails 45 and the first slider 46 may form an X axis movement mechanism 44 enabling a movement in an upper and lower direction on the sheet plane of FIG. 4, and the second rail 48 and the second slider 49 may form a Y axis movement mechanism 47 enabling a movement in the left and right direction on the sheet plane of FIG. 4.

The X axis movement mechanism 44 and the Y axis movement mechanism 47, may each be configured to enable manual movement, or to enable movement by a driving source including a motor or other electric actuators.

In the above described configuration, the tapping device 10 is mounted to the frame 40 in such a manner that the arrangement of the tapping device 10 relative to the frame 40 is changeable by the movement mechanism 43. Specifically, the tapping device 10 is carried by the second slider 49 to be capable of moving in a plane relative to the frame 40 along the first rail 45 and the second rail 48. The tapping device 10 can move in parallel with the surface 21 of the inspection target 2, with the frame 40 in contact with the surface 21 of the inspection target 2 via the protrusion 41. Thus, the tapping on the surface 21 of the inspection target 2, the tapping sound based on the tapping, and the acceleration signal can be efficiently and smoothly detected.

The sound collecting microphone 15 may be mounted to the frame 40 while being fixed to any position on the frame 40. The sound collecting microphone 15 may be mounted to the movement mechanism 43 (for example, the second slider 49) while being movable together with the tapping device 10.

In some embodiments, the inspection apparatus 1 for the inspection target 2 may further include: a first driving source 51, a second driving source 52, and a third driving source 53 that provide driving force to the first sliders 46, the second slider 49, and the tapping tool 11, respectively; and a controller (for example, the data processing unit 30) that controls an operation of at least the first driving source 51, the second driving source 52, and the third driving source 53 (see FIG. 3, for example).

The first driving source 51, the second driving source 52, and the third driving source 53 may each be an electric motor including a stepping motor, an AC servo motor, and the like, for example. For example, an electromagnetic solenoid and the like may be used for the third driving source 53 that drives the tapping tool 11.

According to some embodiments of the disclosure, the controller may be configured to control the first driving source 51, the second driving source 52, and the third driving source 53 to tap each grid 60 of the inspection target area 23 segmented into grids (see FIG. 2A, FIG. 4, and FIG. 5, for example).

For example, the inspection target area 23 may be segmented into the grids 60 arranged at a predetermined interval in each of a vertical direction and a horizontal direction, or at an equal interval in the vertical direction and in the horizontal direction (so that a square shape is defined).

In some embodiments, the ROM 33 may store an automatic diagnosis program 35 for diagnosing the soundness of the inspection target 2. The CPU 31 may readout and load this automatic diagnosis program 35 from the ROM 33 and onto the RAM 32, and execute the automatic diagnosis program 35, so that the controller automatically diagnoses the soundness of the inspection target 2.

With this configuration, the controller can drive the first driving source 51, the second driving source 52, and the third driving source 53 to tap each grid 60 of the inspection target area 23 segmented into grids. Thus, the inspection can be performed by automatically and sequentially tapping the inspection target area 23 on the surface 21 of the inspection target 2, whereby the efficiency of the inspection can largely be improved.

In some embodiments, the data processing unit 30 may be configured to: obtain, as data (Zn) on each measurement point of the inspection target area 23, an average value of results (Ln/Fn) each obtained by dividing a result (Ln) of frequency analysis performed on time series data (Tn) acquired for the measurement point, by exciting force (Fn) at a timing of the acquisition, the average value being based on number of times of the acquisition; and calculate a band level of a frequency band to be evaluated in terms of the data (Zn).

Specifically, the data (Zn) on each measurement point may be represented by the following Formula (1):

$$Zn = \frac{1}{n}\sum_{k=1}^{n}\frac{L_k}{F_k} \tag{1}$$

The frequency band level is represented by the following Formula (2):

$$Zn(fi) = \sum_{k=1}^{i} Zn(f_k) \tag{2}$$

In this manner, as data (Zn) on each measurement point of the inspection target area, a value can be used which is obtained by averaging, according to the number of times of the acquisition, an average value of results (Ln/Fn) each obtained by dividing a result (Ln) of frequency analysis performed on time series data (Tn) acquired for the measurement point, by exciting force (Fn) at a timing of the acquisition of time series data (Tn). Thus, the data is less likely to fluctuate to lead to erroneous detection, whereby the accuracy of the judgement can be improved. Furthermore, the band level of the frequency band to be evaluated in terms of the data (Zn) on each measurement point is calculated. Thus, data to be acquired can be extracted while focusing on a frequency band to be focused that is judged based on the type of the data such as vibrations or sound. Thus, the contour map can be more accurately created.

FIG. 6 is a table illustrating detection results obtained with various inspection methods.

In some embodiments, the data processing unit 30 may be configured to analyze the waveform data about the acceleration signal with a pulse power method (see FIG. 6). The data processing unit 30 may be configured to analyze the waveform data about the tapping sound with envelope processing (see FIG. 6).

For example, the pulse power method includes performing analysis on tapping force applied with the tapping tool 11 for the tapping and the acceleration of the tapping tool 11 due to reaction force against the tapping to detect whether the internal defect 25 is present.

For example, the envelope processing includes performing frequency analysis on an envelope of a vibration waveform. Specifically, absolute value rectification is performed on high-frequency components excited in a resonance system, and the resultant high-frequency components are removed with a low-pass filter so that low-frequency components are extracted.

The present inventors have made vigorous studies to find out that the internal defect 25 in the inspection target 2 can be accurately detected by analyzing the waveform data about the acceleration signal of the tapping with the pulse power method, and by analyzing the waveform data about the tapping sound with the envelope processing.

Thus, by analyzing the waveform data about the acceleration signal with the pulse power method and analyzing the waveform data about the tapping sound with the envelope processing, each of the waveform data about the acceleration signal and the waveform data about the tapping sound can be analyzed by the respective methods enabling highly accurate detection. All things considered, whether the internal defect 25 is present can be more accurately judged by utilizing the combination between the methods and the respective types of waveform data.

In some embodiments, the inspection target 2 may be a wind turbine blade 2A of a wind turbine generation facility. With this configuration, the advantage described in anywhere in the disclosure can be obtained in a situation where the inspection target 2 is the wind turbine blade 2A of the wind turbine generation facility.

Next, an inspection method according to one embodiment of the disclosure is described.

Figure 7:
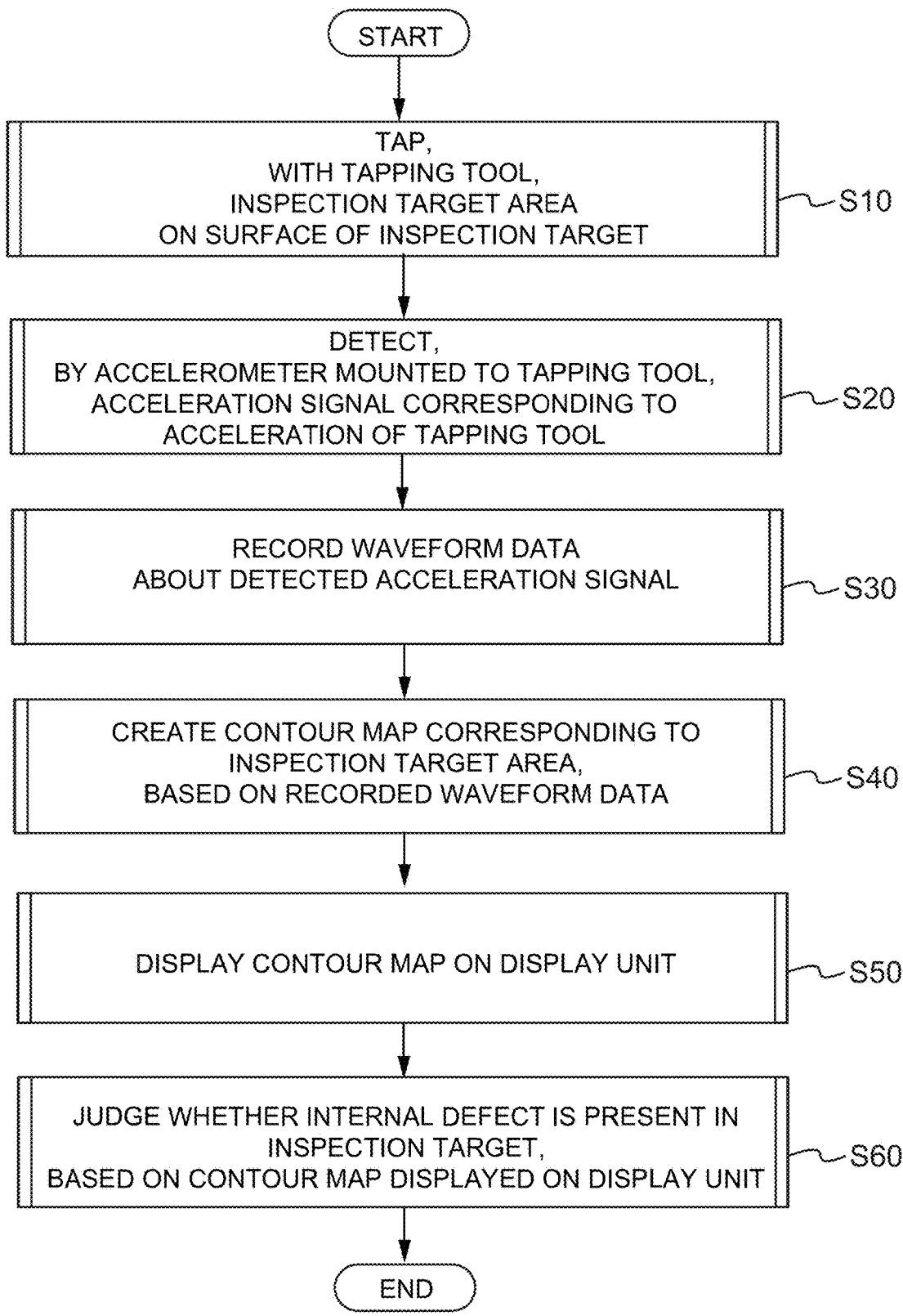
FIG. 7 is a flowchart illustrating an inspection method according to one embodiment.

FIG. 7 is a flowchart illustrating an inspection method according to at least one embodiment of the disclosure.

As illustrated in FIG. 7, an inspection method according to at least one embodiment of the disclosure is an inspection method for an inspection target 2 that is a layered structure 20 including an FRP material 20A and/or a structure 20 made of resin 20B, the method including the steps of: tapping, with a tapping tool 11, an inspection target area 23 on a surface 21 of the inspection target 2 (S10); detecting, by an accelerometer 13 mounted to the tapping tool 11, an acceleration signal corresponding to acceleration of the tapping tool 11 due to reaction force against the tapping (S20); recording waveform data about the detected acceleration signal (S30); creating a contour map 70 corresponding to the inspection target area 23, based on the recorded waveform data (S40); displaying the contour map 70 on a display unit 38 (S50); and judging whether an internal defect 25 is present in the inspection target 2, based on the contour map 70 displayed on the display unit 38 (S60).

This method includes: tapping, with the tapping tool 11, the inspection target area 23 on the surface 21 of the inspection target 2; detecting, by the accelerometer 13, the acceleration signal corresponding to the acceleration of the tapping tool 11 due to the reaction force against the tapping; and recording the waveform data about the detected acceleration signal. The method further includes: creating the contour map 70 corresponding to the inspection target area 23, based on the recorded waveform data; displaying the contour map 70 on the display unit 38; and judging whether the internal defect 25 is present in the structure 20 that is a layered structure 20 including an FRP material 20A and/or a structure 20 made of resin 20B, based on the displayed contour map 70.

With the above-described method, whether the internal defect 25 is present in the inspection target 2 can be judged without being affected by surrounding noise during the measurement for example, because the accelerometer 13 mounted to the tapping tool 11 detects the waveform data about the acceleration signal. Furthermore, whether the internal defect 25 is present in the inspection target 2 can readily be judged without requiring an inspector to have experience or intuition for example, because the contour map 70 corresponding to the inspection target area 23 is displayed on the display unit 38, so that whether the internal defect 25 is present can readily be recognized visually.

In some embodiments, the above-described inspection method may further include a step of measuring, by a sound collecting microphone 15, a tapping sound of the tapping (S21) (see FIG. 8).

The step S30 of recording may include recording waveform data about the tapping sound (step S31), the step S40 of creating the contour map 70 may include creating the contour map 70 based on the recorded waveform data about the acceleration signal, and the contour map 70 based on the waveform data about the tapping sound (step S41), and the step of judging (S60) may include judging whether the internal defect 25 is present based on at least one of the contour map 70 created based on the acceleration signal or the contour map 70 created based on the tapping sound, and preparing an alarm system 39 and/or an eyewear head mounted display, for issuing a notification to an inspector if necessary (step S61).

With this method, the tapping sound of the tapping is measured by the sound collecting microphone 15 to record the waveform data about the tapping sound, and the contour map 70 based on the waveform data about the acceleration signal, and the contour map based on the waveform data about the tapping sound are created. Then whether the internal defect 25 is present is judged based on at least one of the contour maps 70. Thus, whether the internal defect 25 is present can be judged based on at least one of the acceleration signal or the tapping sound of the tapping, whereby accuracy of the judgement can be improved.

In some embodiments, any one of the above-described inspection methods may further include a step of acquiring and recording, in advance, waveform data about the acceleration signal in a non-defective portion 27 of the inspection target 2 (S2). The step of judging (S60) may include judging whether the internal defect 25 is present by comparing the waveform data acquired during inspection with the waveform data about the non-defective portion 27 recorded in advance (see FIG. 9).

With this method, whether the internal defect 25 is present in the inspection target 2 can be judged by comparing the waveform data acquired during inspection with the waveform data about the acceleration signal in the non-defective portion 27 of the inspection target 2 acquired and recorded in advance. In other words, whether the internal defect 25 is present can be judged by comparing a result of the detection based on the acceleration signal and/or the tapping sound of the tapping with the waveform data about the non-defective portion 27 acquired and recorded in advance. Thus, the accuracy of the judgement can further be improved.

In some embodiments, the step of tapping (S10) may include tapping each grid 60 of the inspection target area 23 segmented into grids.

With this method, the inspection target area 23 can be evenly inspected by tapping each grid 60 of the inspection target area segmented into grids. The resultant contour map 70 more accurately reflects the internal defect 25 than that obtained by randomly tapping the inspection target area 23 not segmented into grids, for example. Thus, the accuracy of the judgement can be improved.

In some embodiments, the step of creating the contour map 70 may include: obtaining, as data (Zn) on each measurement point of the inspection target area 23, an average value of results (Ln/Fn) each obtained by dividing a result (Ln) of frequency analysis performed on time series data (Tn) acquired for the measurement point, by exciting force (Fn) at a timing of the acquisition, the average value being based on number of times of the acquisition; and calculating a band level of a frequency band to be evaluated in terms of the data (Zn). The data (Zn) on the measurement point and the frequency band level are the same as those represented by Formulae (1) and (2) described above, and thus the description thereof is omitted.

With this method, as data (Zn) on each measurement point of the inspection target area 23, a value can be used which is obtained by averaging, according to the number of times of the acquisition, an average value of results (Ln/Fn) each obtained by dividing a result (Ln) of frequency analysis performed on time series data (Tn) acquired for the measurement point, by exciting force (Fn) at a timing of the acquisition of time series data (Tn). Thus, the data is less likely to fluctuate to lead to erroneous detection, whereby the accuracy of the judgement can be improved. Furthermore, the band level of the frequency band to be evaluated in terms of the data (Zn) on each measurement point is calculated. Thus, data to be acquired can be extracted while focusing on a frequency band to be focused that is judged based on the type of the data such as vibrations or sound. Thus, the contour map 70 can be more accurately created.

In some embodiments, the step of creating the contour map 70 (S40) may include: analyzing the waveform data about the acceleration signal with a pulse power method, and analyzing the waveform data about the tapping sound with envelope processing.

With this method, the respective methods enabling highly accurate detection can be used for analyzing each of the waveform data about the acceleration signal and the waveform data about the tapping sound. All things considered, whether the internal defect 25 is present can be more accurately judged by utilizing the combination between the methods and the respective types of waveform data.

With at least one embodiment of the disclosure described above, whether the internal defect 25 is present in the inspection target 2 can readily be judged.

It should be noted that the disclosure is not limited to the embodiments described above and also includes embodiments with modifications to the embodiments described above and a combination of these embodiments.

The invention claimed is:

1. An inspection method for an inspection target that is a layered structure including a fiber reinforced plastic material and/or a structure made of resin, the method comprising the steps of: using an inspection apparatus mounted on an unmanned aerial vehicle or a drone; tapping, with a tapping tool, an inspection target area on a surface of the inspection target in a state that the inspection apparatus is pressed against the inspection target by an operation of the unmanned aerial vehicle or the drone; detecting, by an accelerometer mounted to the tapping tool, an acceleration signal corresponding to acceleration of the tapping tool due to reaction force against the tapping; recording waveform data about the detected acceleration signal; creating a contour map corresponding to the inspection target area based on the recorded waveform data using a data processing unit, the contour map indicating whether an internal defect is present in the inspection target displaying the contour map on a display unit; and judging whether the internal defect is present in the inspection target, based on the contour map displayed on the display unit, wherein the inspection target is a curved surface portion of a wind turbine blade of a wind turbine generation facility, and wherein the inspection apparatus comprises: a tapping device including the tapping tool and the accelerometer; a frame for mounting the tapping device; and a protrusion protruding from one side of the frame facing the surface of the inspection target in the state that the inspection device is pressed against the inspection target by an operation of the unmanned aerial vehicle or the drone.

2. The inspection method according to claim 1, further comprising steps of: measuring, by a sound collecting microphone, a tapping sound of the tapping;
  wherein the step of recording includes recording waveform data about the tapping sound, the step of creating the contour map includes creating the contour map based on the recoded waveform data about the acceleration signal, and the contour map based on the waveform data about the tapping sound, and
  the step of judging includes judging whether the internal defect is present, respectively based on at least one of the contour map created based on the acceleration signal or the contour map created based on the tapping sound, and preparing an alarm system and/or an eyewear head mounted display, for issuing a notification to an inspector if necessary.

3. The inspection method according to claim 1, further comprising a step of acquiring and recording, in advance, waveform data about the acceleration signal in a non-defective portion of the inspection target,
  wherein the step of judging includes judging whether the internal defect is present by comparing the waveform data acquired during inspection with the waveform data about the non-defective portion recorded in advance.

4. The inspection method according to claim 1, wherein the step of tapping includes tapping each grid of the inspection target area segmented into grids.

5. The inspection method according to claim 1, wherein the inspection apparatus further comprises:
  a movement unit configured to be capable of changing an arrangement of the tapping device relative to the frame,
  wherein the movement unit includes:
  first rails extending in a first direction along the one side of the frame;
  a first slider movable along the first rail;
  a second rail that is attached to the first slider, extends along the one side, and extends in a second direction intersecting with the first direction; and
  a second slider that carries the tapping device and is movable along the second rail.

6. The inspection method according to claim 5, wherein the inspection apparatus, further comprises:

a first driving source, a second driving source, and a third driving source that provide driving force to the first sliders, the second slider, and the tapping tool, respectively; and a controller that controls an operation of at least the first driving source, the second driving source, and the third driving source, and wherein the controller is configured to control the first driving source, the second driving source, and the third driving source to tap each grid of the inspection target area segmented into grids.

7. The inspection method according to claim 1, wherein the step of judging judges whether the internal defect is present by comparing the waveform data about the acceleration signal acquired during inspection with the waveform data about a nondefective portion of the inspection target or the waveform data at any single point of the inspection target, the waveform data being acquired in advance.

8. The inspection method according to claim 1, wherein the step of creating the contour map includes:

acquiring a component (Ln) of a target frequency band by performing frequency analysis on time series data (Tn) acquired for each measurement point of the inspection target area;

obtaining, as data (Zn) on said each measurement point of the inspection target area, respectively, an average value of results (Ln/Fn) each obtained by dividing the component (Ln) by exciting force (Fn) at a timing of the acquisition, the average value being based on number of times of the acquisition to the each measurement point; and calculating a band level for the target frequency band based on the data (Zn).

* * * * *